United States Patent [19]
Ralston et al.
[11] 4,452,703
[45] Jun. 5, 1984

[54] CONTROL OF SCALE IN SUGAR EVAPORATION EQUIPMENT

[75] Inventors: Paul H. Ralston, Bethel Park; Sandra L. Whitney, Oakdale; Jerry L. Walker, Coraopolis, all of Pa.

[73] Assignee: Calgon Corporation, Pittsburgh, Pa.

[21] Appl. No.: 497,543

[22] Filed: May 24, 1983

Related U.S. Application Data

[63] Continuation of Ser. No. 344,422, Feb. 1, 1982, abandoned.

[51] Int. Cl.$^3$ .................... C02F 5/10
[52] U.S. Cl. .................... 210/698; 210/699; 210/701; 127/16; 127/46.1
[58] Field of Search .................... 210/698, 699, 701; 127/16, 46.1

[56] References Cited

U.S. PATENT DOCUMENTS

| | | | |
|---|---|---|---|
| 3,810,834 | 5/1974 | Jones et al. | 210/698 |
| 4,008,164 | 2/1977 | Watson et al. | 210/698 X |
| 4,018,702 | 4/1977 | Boffardi et al. | 210/698 X |
| 4,048,065 | 9/1977 | Suen et al. | 210/698 |

*Primary Examiner*—Ferris H. Lander
*Attorney, Agent, or Firm*—Michael C. Sudol, Jr.; R. Brent Olson

[57] ABSTRACT

The instant invention is directed to a method for preventing the formation of scale in sugar evaporation equipment comprising adding to the juice from 0.1 to 200 ppm of a polycarboxylic acid or its salt selected from the group consisting of polymaleic acid, amine adducts of maleic anhydride polymers, phosphonobutane tri-carboxylic acid, phosphinocarboxylic acids and copolymers of acrylic acid and an hydroxylated lower alkyl acrylate.

8 Claims, No Drawings

CONTROL OF SCALE IN SUGAR EVAPORATION EQUIPMENT

This is a continuation of application Ser. No. 344,422, filed Feb. 1, 1982 now abandoned.

BACKGROUND OF THE INVENTION

In the refinement of sugar, scale forms in the evaporation equipment over time and reduces the efficiency of the system. Historically, the scale has been removed mechanically or with acid and/or caustic washing procedures. These operations result in expensive downtime, labor costs and corrosion losses. Polyacrylic acid is presently being used to control scale and deposit in sugar evaporation equipment.

The instant invention chemically prevents the formation of scale in sugar evaporation equipment by the addition of polycarboxylate to the juice.

The use of polymaleic acid in the prevention of formation of alkaline metal and alkaline earth metal scale in sea water evaporators is known (U.S. Pat. No. 3,810,834). However, sugar evaporators and their chemical environment are very different from that of desalination systems. The pH of the sugar juice is usually 6.5 to 8 and the temperature in the evaporators is usually 180° to 235° F. (82° to 113° C.). The pH in desalination systems is usually 8 to 9 and the temperature is 180° to 205° C. in low temperature systems and 220° to 240° C. in high temperature systems.

U.S. Pat. No. 4,018,702 discloses amine adducts of maleic anhydride polymers as corrosion inhibitors in cooling water and boiler water systems.

The use of copolymers of acrylic acid and hydroxylated lower alkyl acrylate in inhibiting the formation and deposition of calcium phosphate in cooling water and boiler water systems is disclosed in U.S. Pat. No. 4,029,577.

Sugar evaporators and their chemical environment are very different from that of cooling water systems. The pH in cooling water systems is usually 6.5 to 8.5 and the temperature is usually 32° to 70° C. The quality of boiler water is excellent because the impurities are pre-removed. The pH is usually 10 to 12, the temperature 200° to 250° C. and the pressure 200 to 600 psi.

Phosphonobutane tri-carboxylic acids, phosphinocarboxylic acids and copolymers of acrylic acid and an hydroxylated lower alkyl acrylate have all been recommended for control of scale in recirculated cooling waters.

DESCRIPTION OF THE INVENTION

The instant invention is directed to a method for preventing the formation of scale in sugar juice evaporation equipment comprising adding to the juice from 0.1 to 200 ppm of a polycarboxylic acid or salt thereof selected from the group consisting of polymaleic acid or amine adducts of maleic anhydride polymers, phosphonobutane tri-carboxylic acid, phosphinocarboxylic acids and copolymers of acrylic acid and an hydroxylated lower alkyl acrylate.

The sugar juice is principally made up of the juice and fiber obtained from, for example, sugar cane or sugar beets, plus added water. The elements typically present in sugar juice are summarized in Table I below. The ions typically present in sea water are also included for comparison purposes.

TABLE I

| Element | Clarified Sugar Juice (mg/l)[1] | Sea Water (mg/l)[2] |
|---|---|---|
| Ca | 214 | 410 |
| Mg | 60–120 | 1305 |
| Fe | 21–28 | Nil |
| Si | 94–117 | 0.02–4 |
| P | 18–31 | 0.001–0.1 |
| S | 100–133 | 862 |

[1]Honig, Peter, ed., Principles of Sugar Technology, Elsenier Publishing Co., O. Van Nostrand Co., Inc. (U.S.A.)

[2]The Corrosion Handbook, John Wiley and Sons, Inc., IX Printing, May 1966, and Handbook of Chemistry and Physics, Chemical Rubber Publishing Co., 1962–1963 ed The process by which polymaleic acid or its salts or amine adducts are made is not critical. U.S. Pat. Nos. 3,810,834 and 4,018,702 disclose methods of manufacture. The molecular weight of these polycarboxylates should be in the range of about 200 to about 40,000, and most preferably 400 to 10,000 as determined by light scattering.

The polymaleic acid adducts are preferably employed in their water soluble forms, i.e., alkali metal or ammonium salts. The proportionate amounts of the constituent maleic acid and amine groups present in the polymer chain may vary such that the molar ratio of amine to maleic acid groups may be about 0.1 to about 2.0:1. The preferred amine adducts are polymaleic acid-/aminodiacetate, polymaleic acid/monoamide, $NH_4$ and polymaleic acid/tetramethyl, diaminoethane.

The process by which the copolymer is made is not critical. U.S. Pat. No. 4,029,577; for example, discloses a method of manufacture. The copolymer preferably has a mole ratio of acrylic acid, or its water soluble salt, to hydroxylated lower alkyl acrylate of from about 30:1 to about 1:3 and most preferably 10:1 to 1:1 and possesses a molecular weight of from about 500 to about 40,000 and most preferably 1,000 to 10,000. The only criteria of importance that applies to the mole ratios of the described monomers is that it is desirable that the copolymer be soluble in water. As the proportion of the hydroxylated lower alkyl acrylate is increased, the solubility of the copolymer decreases. The preferred copolymer is hydroxypropyl acrylate/sodium acrylate.

The 4-phosphonobutane tri-carboxylic acid. 1,2,4 and the phosphinocarboxylic acids are available commercially. The phosphinocarboxylic acids are described by the following structure:

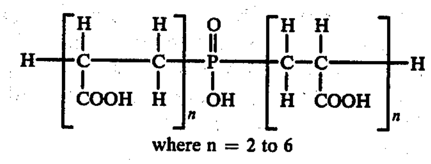

where n = 2 to 6

These inhibitors should be added to the juice in a concentration of about 0.1 to about 200 ppm, preferably in the range 2 to 50 ppm, based on the juice. These inhibitors may be present as the acid or its neutralized, or partially neutralized salt.

EXAMPLES

EXAMPLE 1

The chemical composition of scale in two different sugar mills was identified and quantified by X-ray, spectrograph and microscope in percent composition as summarized in Table II and III.

TABLE II

| | Sugar Mill I | | | | |
|---|---|---|---|---|---|
| | Evaporator Effect | | | | |
| Scale | No. 1 | No. 2 | No. 3B | No. 4A | No. 4B |
| Ca/$PO_4$ (Hydroxyapatite) | >30% | >30% | >1% | —% | —% |
| $Ca(OH)_2$ | | | >30 | >30 | >30 |
| $CaCO_3$ | 4–8 | 8–15 | <1 | <1 | <1 |
| Iron Oxide | <1 | <1 | | | |
| Ca Silicate | | | <1 | <1 | <1 |
| $CaSO_4.2H_2O$ | | | | <1 | |

TABLE III

| | Sugar Mill II | | |
|---|---|---|---|
| | Evaporator Effect | | |
| Scale | No. 2 | No. 4 | No. 7 |
| Ca/$PO_4$ (Hydroxyapatite) | >30% | >30% | 15–20% |
| $Ca(OH)_2$ | | | 20–30 |
| $CaCO_3$ | <1 | <1 | |
| Iron Oxide | <1 | <1 | |
| Ca Silicate | | | <1 |

EXAMPLE 2

The scale inhibiting effectiveness of polymaleic acid was measured for calcium hydroxide inhibition. An accelerated procedure was used wherein 5 mg/l and 10 mg/l of polymaleic acid, having a molecular weight of about 4,000, were present in a supersaturated calcium hydroxide solution. This solution was prepared by mixing calcium chloride and sodium hydroxide in the test solution to give 1.2 times the normal saturation of calcium hydroxide at pH 12.4. The temperature of the solution was held at 150° F. for a period of 24 hours. At the end of 24 hours, the solution was filtered through No. 42 filter paper and analyzed for total calcium concentration by the Schwarzenbach Titration Method (EDTA, chrome black T). Based on the calcium titration value with no inhibitor present (0 percent inhibition) and the titration value with no precipitation (100 percent inhibition), the performance of polymaleic acid as a threshold inhibitor for calcium hydroxide was measured. The 5 mg/l concentration of polymaleic acid gave 23 percent threshold inhibition. The 10 mg/l concentration of polymaleic acid gave 71 percent threshold inhibition of calcium hydroxide.

EXAMPLE 3

The scale inhibiting effectiveness of polymaleic acid was measured for calcium phosphate inhibition. An accelerated procedure was used wherein 1.25 mg/l of polymaleic acid, having a molecular weight of about 4,000, was present in a supersaturated calcium phosphate solution at pH 8.3. This test solution was prepared by mixing solutions of sodium phosphate and calcium chloride in an amount to give about four times the normal saturation of calcium phosphate at pH 8.3. The temperature of the solution was held at 150° F. for a period of 24 hours. At the end of 24 hours stagnant storage, the solution was filtered through No. 42 filter paper and analyzed for the orthophosphate ion concentration by the ascorbic acid reduction, spectrophotometer method. Based on the orthophosphate concentration with no inhibitor present (0 percent inhibition) and the orthophosphate concentration with no precipitation (100 percent inhibition), the performance of polymaleic acid as a threshold inhibitor for calcium phosphate was measured. The 1.25 mg/l concentration of polymaleic acid gave 90 percent scale inhibition.

EXAMPLE 4

The scale inhibiting effectiveness of the amine adducts of polymaleic acid copolymers for calcium carbonate ($CaCO_3$) deposits was measured by an accelerated laboratory test similar to the one described in Example 2. This supersaturated $CaCO_3$ solution was prepared by mixing appropriate concentrations of $Na_2CO_3$ and $CaCl_2$ to give test solutions of about four times the normal $CaCO_3$ saturation at pH 9.5–10. The untreated and inhibitor-treated solutions were stored at 150° F. for 24 hours.

At the end of the 24 hours, the test solution was analyzed for calcium ion concentration by the Schwarzenbach Titration method (EDTA, chrome black T). Based on the calcium ion concentration with no inhibitor present (0% inhibition) and the calcium ion concentration with no precipitation (100% inhibition) the performance of the amine adducts of polymaleic anhydride polymers were evaluated. These amine adducts were useful threshold scale inhibitors for calcium carbonate as shown in Table IV.

TABLE IV

| Inhibitor | Concentration | Percent Inhibition ($CaCO_3$) |
|---|---|---|
| polymaleic acid/ aminodiacetate | 5.0 ppm | 93% |
| polymaleic acid/ monoamide, $NH_4$ | 0.9 ppm | 97% |
| polymaleic acid/ tetramethyl, diaminoethane | 1.25 ppm | 97% |

EXAMPLE 5

The procedure of Example 3 was repeated using 1.25 mg/l of 2-phosphonobutane tri-carboxylic acid, 1, 2, 4. There was 86 percent scale inhibition of calcium phosphate.

EXAMPLE 6

The procedure of Example 3 was repeated using 1.25 mg/l of Natrol 42 (a hydroxypropyl acrylate/sodium acrylate copolymer manufactured by National Starch and Chemical Corporation). There was 90 percent scale inhibition of calcium phosphate.

EXAMPLE 7

The procedure of Example 4 was repeated using 1.0 ppm and 2.1 ppm phosphinocarboxylic acid (n=approximately 2).

71% and 97% inhibition of calcium carbonate ($CaCO_3$) were observed for the two respective concentrations.

What is claimed is:

1. A method for preventing the formation of calcium phosphate and calcium hydroxide scale in sugar juice evaporation equipment comprising adding to the juice from about 0.1 to about 200 ppm of a polycarboxylic acid or its salt selected from the group consisting of polymaleic acid or amine adducts of maleic anhydride polymers, phosphonobutane tri-carboxylic acid, phophinocarboxylic acids and copolymers of an acrylic acid and an hydroxylated lower alkyl acrylate.

2. The method of claim 1, wherein said polycarboxylate is polymaleic acid.

3. The method of claim 2, wherein said polymaleic acid has a molecular weight of about 200 to about 40,000.

4. The method of claim 1, wherein said polycarboxylate is an amine adduct of a maleic anhydride polymer.

5. The method of claim 1, wherein said polycarboxylate is phophonobutane tri-carboxylic acid.

6. The method of claim 1, wherein said polycarboxylate is a phosphinocarboxylic acid.

7. The method of claim 1, wherein copolymer is a hydroxypropyl acrylate/sodium acrylate copolymer.

8. The method of claim 7, wherein said hydroxypropyl acrylate/sodium acrylate copolymer has a mole ratio of sodium acrylate to hydroxypropyl acrylate of from about 30:1 to about 1:3 and a molecular weight of from about 500 to about 500,000.

* * * * *